(12) United States Patent
Schultheiss et al.

(10) Patent No.: US 12,498,503 B2
(45) Date of Patent: Dec. 16, 2025

(54) MICROWAVE BARRIER SYSTEM

(71) Applicant: VEGA Grieshaber KG, Wolfach (DE)

(72) Inventors: Daniel Schultheiss, Hornberg (DE); Michael Fischer, Alpirsbach (DE)

(73) Assignee: VEGA Grieshaber KG, Wolfach (DE)

( * ) Notice: Subject to any disclaimer, the term of this patent is extended or adjusted under 35 U.S.C. 154(b) by 375 days.

(21) Appl. No.: 18/332,383

(22) Filed: Jun. 9, 2023

(65) Prior Publication Data

US 2023/0400600 A1   Dec. 14, 2023

(30) Foreign Application Priority Data

Jun. 10, 2022 (EP) ...................................... 22178479
Jun. 10, 2022 (EP) ...................................... 22178491

(51) Int. Cl.
*G01V 8/00* (2006.01)
*G01V 3/12* (2006.01)

(52) U.S. Cl.
CPC ................ *G01V 8/005* (2013.01); *G01V 3/12* (2013.01)

(58) Field of Classification Search
CPC . G01V 3/12; G01V 8/005; G01V 8/20; G01V 3/00
See application file for complete search history.

(56) References Cited

U.S. PATENT DOCUMENTS 9,752,917 B2    9/2017   Weber
10,866,134 B2   12/2020  Griessbaum et al.
(Continued)

FOREIGN PATENT DOCUMENTS

DE   25 39 438 A1   3/1977
DE   3302731 A1    8/1984
(Continued)

OTHER PUBLICATIONS

Extended European Search Report issued Nov. 25, 2022 in European Patent Application No. 22178479.6, citing references 1, 15, 19, 20, 21, and 25 therein, 13 pages.
(Continued)

*Primary Examiner* — Timothy X Pham
(74) *Attorney, Agent, or Firm* — Oblon, McClelland, Maier & Neustadt, L.L.P.

(57) ABSTRACT

A microwave barrier system is provided, including: a first microwave barrier including a first microwave transmitter and receiver, the first transmitter including an electrically tunable microwave generator and being configured to be operated at a selectable microwave frequency; and a second microwave barrier including a second microwave transmitter and receiver, the second transmitter including an electrically tunable microwave generator and being configured to be operated at a selectable microwave frequency, the system being configured to determine microwave operating channels in an available frequency range for microwave barriers by one of the receivers, and to assign a respective microwave operating channel to at least one of the barriers to reduce mutual interference between the barriers, the barriers further including respective communication devices to signal-couple the respective receiver with the respective transmitter to transmit a microwave operating channel for operation of the barriers from the receivers to the transmitters.

17 Claims, 3 Drawing Sheets

(56) References Cited

U.S. PATENT DOCUMENTS

| | | | |
|---|---|---|---|
| 2004/0189510 A1* | 9/2004 | Negro | G08B 13/1645 |
| | | | 342/111 |
| 2013/0252553 A1 | 9/2013 | Hyon et al. | |
| 2014/0210670 A1 | 7/2014 | Weber | |
| 2017/0356787 A1* | 12/2017 | Welle | G01F 23/284 |

FOREIGN PATENT DOCUMENTS

| | | |
|---|---|---|
| DE | 10 2009 033 435 A1 | 1/2011 |
| DE | 10 2013 100 817 A1 | 7/2014 |
| DE | 10 2013 220 131 A1 | 4/2015 |
| EP | 3 418 700 A1 | 12/2018 |
| EP | 3 575 755 A1 | 12/2019 |

OTHER PUBLICATIONS

Extended European Search Report issued Dec. 2, 2022 in European Patent Application No. 22178491.1, citing references 3, 4, and 25 therein, 8 pages.

Anonymous, "Technical Information Soliwave FDR56/FQR56 Microwave Barrier", Endress+Hauser, Aug. 27, 2018, pp. 1-48, XP 55979731 A.

* cited by examiner

MICROWAVE BARRIER SYSTEM

CROSS-REFERENCE TO RELATED APPLICATIONS

This application claims the benefit of priority under 35 U.S.C. § 119 from European Patent Application Nos. 22 178 479.6 and No. 22 178 491.1, both filed on 10 Jun. 2022, the entire contents of each of which are incorporated herein by reference.

BACKGROUND

A microwave barrier typically transmits a continuous wave microwave signal in the direction of an associated receiver. If the direct transmission path from transmitter to receiver is interrupted by an object or by a fill level in a vessel, this is noticeable by a missing or reduced receive level in the receiver. The decreasing reception level can be detected in the receiver and converted into a switching signal.

To determine a direction from which an object passes the barrier, for example, a system with two receivers and one transmitter or two microwave barriers operating completely independently of each other can be used. If an object passes the barriers set up in this way, a direction of passage can be determined from the switching sequence. If the two receivers in a system of multiple microwave barriers are operated at a small spatial distance from each other, microwave radiation from a microwave transmitter unit of one microwave barrier can interfere with a receiver unit of an adjacent other microwave barrier.

This can reduce a sensitivity, and thus a signal-to-noise ratio, of the individual receiving unit. Such a reduced signal-to-noise ratio can result in an increase in a probability of malfunction or misconnection of the affected microwave barrier. To increase signal-to-noise ratios at adjacent microwave receiver units, different polarization planes can typically be selected for the adjacent microwave barriers.

Further, positions of transmitters and receivers of adjacent microwave barriers can typically be interchanged such that a transmitter of one microwave barrier is placed adjacent to a receiver of the other microwave barrier. Thus, the transmitter of one microwave barrier cannot directly interfere with the receiver of the other microwave barrier. Thus, decoupling of the two microwave barriers can be achieved.

SUMMARY

Beyond a plurality of three spatially adjacent microwave barriers, the signal-to-noise ratio can no longer be improved by the measures described above. In addition, a decoupling of the microwave barriers by means of different polarization planes of the microwave radiation is less effective the more microwave barriers are operated in immediate proximity to each other. I.e., the interference caused by microwave transmitter units in non-microwave barriers, i.e., foreign receiver units, can increase with the plurality of microwave barriers. On the other hand, to determine, for example, a position of an object in a room or a filling level in a vessel, more than two microwave barriers can be necessary at a small spatial distance from each other.

According to aspects of the invention, a microwave barrier system according to the features of the independent claim is proposed. Advantageous embodiments are the subject of the dependent claims and the following specification.

Throughout this specification of the invention, the sequence of method steps is presented in such a way that the method is easily understood. However, the person skilled in the art will recognize that many of the process steps can also be performed in a different sequence and lead to the same result. In this sense, the sequence of process steps can be changed accordingly and is thus also disclosed.

According to an aspect, a microwave barrier system comprising a first microwave barrier and at least one second microwave barrier is proposed. A microwave transmitter unit of the first microwave barrier comprises an electrically tunable microwave generator, wherein the first microwave barrier is configured to operate at a first selectable microwave frequency based on the microwave transmitter unit.

A microwave transmitter unit of the second microwave barrier comprises an electrically tunable microwave generator, and the first microwave barrier is configured to operate at a second selectable microwave frequency based on the microwave transmitter unit. The first microwave barrier and the second microwave barrier respectively comprise a microwave transmitter unit and a microwave receiver unit. In this regard, the microwave barrier system is configured by means of the respective microwave receiver unit to determine microwave operating channels, in particular for operating the respective microwave barrier, in an available frequency range for microwave barriers, and the microwave barrier system is configured to assign a microwave operating channel to the respective microwave barriers of the microwave barrier system, respectively, in such a manner that mutual interference between the microwave barriers is decreased. The respective microwave barrier comprises a communication unit configured to signal-couple the respective microwave receiver unit with the respective microwave transmitter unit, by wire and/or by wireless, in order to transmit the microwave-operating channel for the operation of the respective microwave barrier from the microwave receiver unit to the microwave transmitter unit.

The respective microwave receiver unit can be coupled to the respective microwave transmitter unit of the respective microwave barriers by means of a microwave signal based on the respective microwave-operating channel to establish a coupling path between the respective microwave transmitter unit and the respective receiver unit. The microwave barrier system can be arranged to determine a damping of the microwave signal in the respective coupling path.

In this regard, the available frequency range can be stored in the microwave barrier system, in particular by means of the respective microwave receiver unit, and/or provided for an operation of the microwave barrier system, in particular of the respective microwave receiver unit.

The microwave receiver unit can be arranged to determine the microwave-operating channel from the available frequency range for microwave barriers in order to decrease mutual interference between the microwave barriers.

The communication unit of the respective microwave barrier can monodirectionally and/or bidirectionally couple the microwave receiver unit to the respective microwave transmitter unit to transmit the microwave-operating channel from the microwave receiver unit to the microwave transmitter unit. In this regard, this coupling can be independent of the coupling of the microwave transmitter unit with the microwave receiver unit, based on the selectable microwave frequency, by means of which a damping in the coupling path of the respective microwave barrier can be determined.

Such signal-wise coupling by means of the communication unit can, for example, be effected by means of a supply line of the microwave receiver unit and/or the microwave transmitter unit and/or a separate wired coupling and/or can be effected by means of a wireless signal-wise coupling, such as a radio link, e.g., via BLUETOOTH® or wireless local area network (WLAN).

The respective communication unit can comprise at least two communication subunits, wherein the microwave receiver unit comprises one communication subunit and the microwave transmitter unit comprises the second communication subunit, which are respectively set up for transmission of the particular microwave operating channel from the microwave receiver unit to the microwave transmitter unit and/or for reverse transmission from the microwave transmitter unit to the microwave receiver unit.

The microwave transmitter unit of the respective microwave barrier can be configured to generate and radiate a microwave signal toward the microwave receiver unit, the microwave receiver unit being spatially separated from the microwave transmitter unit, and the respective microwave transmitter unit of the respective microwave receiver unit of a respective microwave barrier being assigned to each other. Between the microwave transmitter unit and the associated receiver unit, a coupling path can be defined characterizing the spatial region by coupling the microwave transmitter unit and the receiver unit by means of a respective microwave signal corresponding to the respective microwave frequency of the respective microwave-operating channel. If the direct transmission path from the microwave transmitter unit to the microwave receiver unit is interrupted by an object or by a level of a medium in a vessel, this can be determined by a missing or reduced reception level in the microwave receiver unit. This damping of the receive level can be detected in the microwave receiver unit and converted into a switching signal for the microwave barrier system.

A presence of an object within the respective coupling path of the respective microwave barrier can be determined by detecting, depending on an interaction of the object in a respective coupling path between the respective microwave transmitter unit and the respective microwave receiver unit, a damping of the microwave signal based on the respective microwave frequency of the respective microwave barrier.

In this regard, the microwave signal is a signal based on the respective microwave frequency, or the respective microwave operating channel, of the respective microwave barrier and is transmitted by the microwave transmitter unit and is received by the respective microwave receiver unit in order to determine a damping of the microwave signal in the coupling path, in particular by means of the respective microwave receiver unit, for example in order to determine a position of an object within the coupling path.

The respective microwave transmitter unit of a respective microwave barrier can be arranged to be operated by means of an electrical tuning of a microwave generator of the microwave transmitter unit, at a selectable microwave frequency. Additionally or alternatively, the respective receiving unit of a respective microwave barrier can be arranged to be operated, in particular by means of an electrical tuning of a microwave generator of the receiving unit, with a selectable microwave frequency in order to selectively operate a microwave signal received by the microwave receiving unit, in particular with respect to a microwave operating channel, and/or to selectively detect the microwave signal accordingly.

According to an aspect, it is proposed that the respective microwave barrier of the microwave barrier system comprises a selectable microwave operating channel in which the respective microwave transmitter unit transmits the microwave signal according to the selected microwave operating channel and/or the respective microwave receiver unit selectively determines and/or detects the microwave signal according to the selected microwave operating channel, in particular to determine a damping of the microwave signal in the coupling path.

A currently available frequency range that can be used by microwave barriers is generally limited to license-free frequency bands regulated in Europe for license-free "short-range devices" or ultra-wideband (UWB) devices. In addition, the microwave barrier system can operate in other frequency bands. Frequency bands that can be reasonably used for the microwave barrier application are, for example, in the range of 2.4 GHz to 2.4835 GHz; and/or 5.725 GHz to 5.875 GHz; and/or 24 GHz to 24.25 GHz; and/or 57 GHz to 64 GHz; and/or 61 GHz to 61.5 GHz; and/or 122 GHz to 123 GHz; and/or 174.8 GHz to 182 GHz; and/or 185 GHz to 190 GHz; and/or 231.5 GHz to 250 GHz; and/or 244 GHz to 246 GHz.

The frequency bands available and specified above are typically sufficiently wide to define microwave-operating channels therein for a variety of microwave barriers.

For example, the frequency band from 24 GHz to 24.25 GHz can be used to define microwave frequency channels of width $\Delta f=12.5$ MHz with a plurality of microwave frequency channels n=20 between a lower frequency fu=24 GHz and an upper frequency fo=24.25 GHz.

By distributing a plurality of microwave operating channels among a plurality of microwave barriers, mutual interference between the respective microwave barriers in a microwave barrier system, corresponding to an application of a frequency division multiplexing (FDM) method, can be reduced.

The microwave-operating channel can be the microwave frequency channel determined to minimize interference from extraneous signals and used to operate the microwave barriers.

The extraneous signals can be signals detected by the respective microwave receiver unit, in particular when determining the microwave-operating channel, and generated, for example, by another microwave transmitter unit of another microwave barrier and/or by another microwave source and/or another interference radiation source.

According to an aspect, the microwave barrier system can comprise a plurality of microwave barriers, wherein at least a portion of the microwave barriers are arranged such that a respective microwave transmitter unit can radiate into a microwave receiver unit of a respective adjacent microwave barrier.

Advantageously, by the microwave barrier system described herein with the signal-wise coupling of the microwave receiver unit and the microwave transmitter unit for transmitting the microwave operating channel, the respective microwave barriers can be operated with respective microwave operating channels, the respective microwave operating channels being determined such that mutual interference of the microwave barriers of the microwave barrier system is decreased. In this regard, the signal coupling of the microwave receiver unit and the microwave transmitter unit can be independent of the operational coupling, which is an operational coupling of the respective microwave barriers by means of the microwave-operating channel.

By appropriately determining the respective microwave-operating channel of the respective microwave barrier, faulty switching of the respective microwave barrier due to other radio frequency signals can be avoided and/or decreased.

In such a microwave barrier system, interference from several microwave barriers that are operated adjacent to each other, in particular at a short distance from each other, can be reduced. This is because when microwave barriers are operated adjacent to each other, a microwave transmitter unit can radiate into a microwave receiver unit of an adjacent microwave barrier. Different microwave frequency channels for different microwave barriers in a microwave barrier system can increase interference distances of the individual microwave barriers, since the respective microwave barrier can selectively determine, by means of the microwave receiver unit, the respective microwave signal emitted by the microwave transmitter unit, corresponding to the assigned microwave frequency channel, which in turn reduces a probability and/or a frequency of faulty switching in this particular constellation in the microwave barrier system.

Advantageously, in this method, it is not necessary to have precise prior knowledge of the intended use or expertise of the user to adjust the microwave transmitter unit and/or microwave receiver unit to match each other, thereby decreasing interference. The automatic determination described here during a start-up or in the event of a malfunction by means of a sequence for activating the microwave barrier system, based on the microwave barrier system described, can offer significantly more convenience and safety here.

The selectable microwave frequency for the operation of the respective microwave barriers, in particular by means of an electrical tuning of oscillators for generating the microwave on the transmitter side and/or selecting microwave frequency channels on the receiver side, enables a user to select a suitable microwave operating channel for each microwave barrier and to change it at any time. Thus, an optimal configuration parameter of multiple adjacent microwave barriers in terms of interference resistance can be ensured.

Furthermore, by using electrically tunable oscillators for generating microwave signals, a hardware effort of the microwave barrier system can be reduced.

Advantageously, such an electrically tunable oscillator can be set up to generate a frequency in a temperature-stable manner in order to subdivide the available frequency range into as numerous microwave operating channels as possible so that the microwave barriers can then be operated reliably, in particular in the event of temperature fluctuations, within correspondingly narrow channels in terms of frequency range.

Advantageously, an electrically tunable oscillator can be arranged to be tuned very quickly to individual microwave operating channels. Such an electrically tunable oscillator for generating a microwave frequency is described in an embodiment example below.

By means of a respective microwave barrier, which can be operated with a selectable microwave frequency for the microwave-operating channel, a higher flexibility can be achieved, in particular for a reconfiguration of an existing arrangement of microwave barriers in a microwave barrier system. This can be particularly advantageous if a new interference source becomes active in an environment surrounding the microwave barrier system.

In order to minimize the interference, the microwave frequency channels can be selected, in particular by means of the microwave receiver unit, such that spatially adjacent microwave barriers are assigned non-adjacent microwave frequency channels in terms of frequency. That is, in other words, spatially adjacent independent microwave barriers transmit in transmission channels that are not adjacent in frequency. For this purpose, the microwave barrier system can be provided with a plurality and/or an arrangement of the respective microwave barriers.

The determination of the operating channel can be done in a start-up phase of the microwave barrier system and/or in the presence of disturbances of the operation of the microwave barrier system.

The available frequency range for microwave barriers can be provided by retrieving it from a memory area of the respective microwave barrier, in particular the respective receiver unit, and/or by providing it for an operation of the respective microwave barrier by means of an interface.

According to an aspect, it is proposed that the first microwave barrier and the second microwave barrier are any microwave barriers in a system of a plurality of microwave barriers arranged adjacent to each other, respectively.

According to an aspect, it is proposed that the first microwave barrier is signal coupled to the second microwave barrier, in particular by means of the respective communication units, to provide a microwave operating channel for the second microwave barrier, by means of the first microwave barrier and/or to transmit the microwave operating channel of the second microwave barrier to the first microwave barrier and/or to transmit an extraneous signal amplitude determined by the microwave receiver unit of the second microwave barrier to the first microwave barrier, in particular for determining the microwave operating channel for the first microwave barrier.

This can be used, for example, to transmit the respective microwave-operating channel and the determined extraneous signal amplitudes, together with the associated frequencies, to the other microwave barrier, respectively.

According to an aspect, it is proposed that the respective communication unit of the first microwave barrier and/or the respective communication unit of the second microwave barrier are arranged to be signal coupled to each other via BLUETOOTH® and/or WLAN.

In a system of a plurality of microwave barriers, the first microwave barrier can be arranged, in particular according to a master-slave method, to determine microwave-operating channels for the plurality of microwave barriers after the respective microwave barriers have transmitted the respective determined extraneous signal amplitudes to the first microwave barrier. The first microwave barrier can be arranged to transmit the microwave operating channels it determines for the respective microwave barriers to the respective microwave barriers, and the respective microwave barriers can be arranged to adjust these transmitted microwave-operating channels for operation of the respective microwave barrier. That is, in the case of a plurality of microwave barriers in a microwave barrier system, all microwave transmitter units and microwave receiver units can be arranged to communicate with all other microwave transmitter units and microwave receiver units, in particular by means of the respective communication units. In particular, the determination of the respective microwave-operating channel for the plurality of microwave barriers can be performed after extraneous signal amplitudes have been determined by the plurality of microwave barriers and transmitted to the first microwave barrier. This method can be used to prevent extraneous signals from other microwave transmitter units or other microwave sources and/or other sources of interference from causing false switching. In this regard, the microwave barrier system can be arranged to sequentially activate or deactivate the respective microwave transmitting units of the respective microwave barriers to determine respective microwave operating channels that decrease mutual interference to the microwave barriers.

The microwave barrier system can comprise at least two microwave barriers, for example, to detect, or determine, two positions of an object within the microwave barrier system.

With a plurality of microwave barriers within a microwave barrier system, the microwave barrier system can be arranged to additionally determine a movement of an object and/or a shape change of an object, for example with an object in the form of a medium, by determining a time sequence of damping of the microwave signal within the plurality of microwave barriers.

For operation of the first microwave barrier, the microwave transmitter unit of the first microwave barrier can be arranged to generate a microwave signal having a frequency corresponding to the determined operating channel transmitted by means of a communication unit of one of the microwave barriers of the microwave barrier system.

According to an aspect, it is proposed that the microwave barrier system is configured to assign a respective microwave operating channel to the respective microwave barriers depending on a provided plurality of microwave barriers and/or a provided arrangement of the respective microwave barriers in the microwave barrier system such that spatially adjacent microwave barriers of the microwave barrier system are assigned frequency channels such that mutual interference by microwave irradiation of spatially adjacent microwave barriers in the microwave barrier system is reduced.

In this regard, the arrangement of the respective microwave barriers in the microwave barrier system describes a respective mutual spacing and/or a respective spatial orientation and/or a respective extension of the plurality of microwave barriers of the microwave barrier system.

According to an aspect, it is proposed that the microwave barrier system is configured to distribute the microwave frequency channels of the assigned and/or available microwave frequency spectrum to the respective microwave barriers such that spatially adjacent microwave barriers are assigned microwave frequency channels that are as widely separated in frequency as possible to minimize mutual interference between the at least two microwave barriers in the microwave barrier system.

A respective microwave barrier can comprise a microwave transmitter unit that generates and radiates a microwave signal toward a respective assigned microwave receiver unit. The microwave receiver unit of the respective microwave barrier, which is spatially separated from the respective microwave transmitter unit, can be assigned to the microwave transmitter unit. A respective coupling path can be defined between the respective microwave transmitter unit and the respective associated microwave receiver unit, which coupling path characterizes the spatial area in which the respective microwave transmitter unit and the respective microwave receiver unit are operatively coupled by means of the microwave signal. If the direct transmission path in the coupling path from the respective microwave transmitter unit to the respective microwave receiver unit is interrupted by an object and/or by a filling level of a medium in a vessel, this can be detected by a missing reception level or a reduced reception level of the microwave signal corresponding to a damping in the respective associated microwave receiver unit. This decreasing of the reception level can be detected in the respective assigned microwave receiver unit and converted, for example, into a respective switching signal, in particular for process monitoring.

For example, with this method, a plurality of adjacent microwave barriers can determine the respective microwave operating channels from the microwave frequencies in such a way that adjacent microwave barriers are assigned non-adjacent microwave operating channels in terms of frequency in order to minimize interference. That is, in other words, adjacent independent microwave barriers do not transmit at adjacent frequency channels after determining the respective microwave operating channels.

According to an aspect, it is proposed that the receiving unit of at least one microwave barrier is configured to determine the damping of the microwave signal based on an associated microwave-operating channel. Preferably, the microwave-operating channel can be determined and/or selected by means of the receiving unit. Particularly preferably, the microwave-operating channel can be assigned to the microwave barrier by the microwave barrier system.

The microwave barrier can be arranged to filter out microwave signals from another microwave barrier whose operation is based on a different microwave-operating channel, in order to decrease mutual interference between the respective microwave barriers. Such selection of the microwave-operating channel by the microwave receiver unit can be performed, in particular by means of an intermediate frequency filter of the respective microwave receiver unit.

According to an aspect, it is proposed that the microwave barrier system is configured to assign microwave operating channels to the microwave barriers depending on the provided arrangement of the respective microwave barriers in the microwave barrier system such that spatially adjacent microwave barriers of the microwave barrier system are assigned non-adjacent microwave frequency channels, respectively. Advantageously, this can decrease the mutual interference of the microwave barriers.

According to an aspect, it is proposed that the respective microwave receiver unit is configured to determine an extraneous signal amplitude for at least one microwave operating channel of a plurality of available microwave operating channels; and the microwave operating channel is determined from the available frequency channels based on the at least one determined extraneous signal amplitude of the available microwave operating channels to decrease interference with operation of the respective microwave barrier by an extraneous signal.

For this purpose, the microwave barrier can be set up to deactivate the microwave transmitter unit for determining the extraneous signal amplitude. Depending on the determined extraneous signal, the microwave-operating channel can be assigned to operate a respective microwave barrier at a microwave frequency at which the lowest possible extraneous signal has been determined.

According to an aspect, it is proposed that the microwave receiver unit be signal coupled to the microwave transmitter unit by wire by means of the communication unit and/or by wireless by means of the communication unit, in particular wireless by BLUETOOTH® and/or wireless by WLAN and/or by wire by means of a respective power supply line.

The energy supply line can be an electrical line with which the microwave receiver unit and/or the microwave transmitter unit are supplied with electrical energy.

The signal-wise coupling between the microwave transmitter unit and the microwave receiver unit can be arranged to provide monodirectional or bidirectional communication between the microwave receiver unit and the microwave transmitter unit and/or the microwave transmitter unit and the microwave receiver unit.

A respective microwave transmitter unit of a respective microwave barrier can be arranged to transmit information to the microwave receiver unit by means of the microwave signal, in which the respective microwave transmitter unit modulates the microwave signal with the information and/or the microwave receiver unit is arranged to selectively demodulate the modulated microwave signal to receive the information.

According to an aspect, it is proposed that the respective communication unit of the respective microwave barrier and/or the communication unit of the microwave barrier system is configured to signal-couple the respective microwave receiver unit to a further microwave barrier to establish the microwave operating channel for operation of the further microwave barrier, and/or to transmit the operating channel to the further microwave barrier and/or to transmit an extraneous signal amplitude determined by the receiving unit of the further microwave barrier to the respective microwave barrier and/or to transmit the determined extraneous signal amplitude of the respective microwave barrier to the further microwave barrier.

By means of the communication unit thus configured, a selected microwave transmitter unit of the microwave barrier system and/or a selected microwave receiver unit of the microwave barrier system can be configured, in particular in accordance with a master-slave method, to determine the operating channels for a plurality of microwave barriers, and to transmit them to the respective microwave transmitter units of the plurality of microwave barriers.

According to an aspect, it is proposed that the first microwave barrier is disposed spatially adjacent to the second microwave barrier; and the microwave barrier system is configured to determine the microwave-operating channel of the first microwave barrier while the microwave transmitter unit of the second microwave barrier is operating on a second microwave-operating channel.

In this way, the respective interference by the second microwave barrier can be determined and a microwave-operating channel for the first microwave barrier can be determined, such that mutual interference between the microwave barriers is decreased.

According to an aspect, it is proposed that interference radiation caused by an operation of the second microwave barrier transmitter unit on the second operating channel is interpreted by the first microwave barrier as extraneous signal amplitude to determine the microwave-operating channel for the first microwave barrier.

The operating channel of the first microwave barrier can thus be determined from the available microwave operating channels depending on the measured extraneous signal amplitude in each microwave-operating channel.

According to an aspect, it is proposed that the microwave barrier is configured to transmit diagnostic information from the respective microwave transmitter unit to the respective microwave receiver unit by means of the respective communication unit in order to prevent and/or determine a malfunction of the respective microwave barrier.

The signal-wise coupling of the microwave transmitter unit to the microwave receiver unit by means of the communication unit of a microwave barrier can be arranged to additionally transmit diagnostic information. For example, in the event of a defect on the microwave transmitter unit side, the microwave transmitter unit can transmit a fault message to the microwave receiver unit so that the microwave receiver unit can indicate and/or provide a fault message to a user. In addition, the microwave receiver unit can be arranged, in the presence of a certain diagnostic information, not to generate a switching signal, even though the damping of the microwave frequency of the microwave-operating channel determined by the microwave receiver unit exceeds a defined threshold, because the diagnostic information has communicated a fault to the microwave transmitter unit.

According to an aspect, it is proposed that a microwave barrier is configured to transmit a microwave transmit power of the microwave transmitter unit from the microwave transmitter unit to the microwave receiver unit by means of the communication unit. By adjusting the microwave transmit power, a signal-to-noise ratio from an extraneous signal can be improved and/or mutual interference between microwave barriers in the microwave barrier system can be decreased. Alternatively or additionally, by transmitting the transmit power to the microwave receiver unit, the sensitivity for triggering the microwave barriers can be adjusted to the transmit power.

According to an aspect, it is proposed that the respective microwave receiver unit is coupled to the respective microwave transmitter unit by means of a microwave signal based on the respective microwave-operating channel to establish a coupling path between the respective microwave transmitter unit and the respective receiver unit. In particular, the microwave barrier system can be arranged to determine a damping of the microwave signal in the respective coupling path. Preferably, the microwave signal can be used to determine a damping of the microwave signal in the respective coupling path of the respective microwave barrier.

In this regard, the coupling by means of the microwave signal can be different from the wired and/or wireless signal-wise coupling of microwave receiver unit and microwave transmitter unit and/or the wired and/or wireless signal-wise coupling of microwave transmitter unit and receiver unit, wherein the signal-wise coupling can be provided in particular by means of the communication unit.

According to an aspect, it is proposed that at least one of the microwave barriers of the microwave barrier system is configured to be operated based on a modulated microwave signal to decrease mutual interference of at least two microwave barriers operated spatially adjacent to each other in the microwave barrier system.

For this purpose, the microwave transmitter unit of the respective microwave barrier can be arranged to generate a modulated microwave signal based on the microwave-operating channel and/or the respective microwave receiver unit can be arranged to determine the damping of the microwave signal based on the modulated microwave signal. In this regard, the microwave barrier system can be arranged for a respective microwave barrier of the microwave barrier system to comprise a modulation of the microwave signal that is different from a modulation of the other microwave barriers.

According to an aspect, it is proposed that the first microwave barrier and the second microwave barrier respectively comprise a modulated microwave signal, wherein the modulation of the microwave signal of the first microwave barrier is different from the modulation of the second microwave barrier.

According to an aspect, it is proposed that in the microwave barrier system at least one microwave barrier is configured to couple the microwave transmitter unit to the associated and/or coupled microwave receiver unit, by means of the modulated microwave signal, to transmit information from the microwave transmitter unit to the respectively associated receiver unit.

In this regard, the coupling of the microwave transmitter unit to transmit information differs from the operational or operational coupling of the microwave transmitter unit to the microwave receiver unit to establish the coupling path in that, in the coupling to transmit information using a modulated microwave signal, additional information beyond the operational operation of a microwave barrier is transmitted to the microwave receiver unit. In particular, the information transmitted to the microwave receiver unit from the microwave transmitter unit can be an operational status of the microwave transmitter unit and/or diagnostic information to prevent malfunction and/or false triggering of the microwave barrier.

According to an aspect, it is proposed that the respective microwave barrier is configured to transmit, by means of the modulated microwave signal, information about a transmitted microwave power of the microwave transmitter unit to the microwave receiver unit, in order to determine the damping in the coupling path between the microwave transmitter unit and the microwave receiver unit by transmitting the microwave power to the respective microwave receiver unit, by means of the microwave receiver unit.

When the microwave power is transmitted to the microwave receiver unit, conclusions can be made about the object in the transmission path of the barrier, for example, conclusions related to the size of the object or its transparency to the microwave signal.

In other words, a structure of the respective microwave barrier with spatially separated microwave transmitter unit and microwave receiver unit can be used for data transmission corresponding to a microwave link. A data signal modulated onto the microwave signal of the microwave transmitter unit can be demodulated and evaluated again in the receiver unit. For example, when the transmission link is free, diagnostic data, such as a transmission power of the microwave transmitter unit, a value of an actual supply voltage, etc., can be transmitted from the microwave transmitter unit and evaluated by means of the receiver unit. A possible failure of the microwave transmitter unit or a degeneration of the transmission path can thus be detected at an early stage and is not misinterpreted as a "busy transmission path" in the absence of a signal at the receiver. Degeneration of the transmission path can occur if, for example, a tree grows in the transmission path and the transmission signal is increasingly damped over time as a result.

According to an aspect, it is proposed that the microwave transmitter unit of the at least one microwave barrier is configured to generate a microwave signal that is modulated, and a receiver unit coupled to the thus configured transmitter unit is configured to selectively detect the damping of the microwave signal based on the modulated microwave signal.

According to this aspect, a designator can be transmitted from the microwave transmitter unit to the receiver unit by means of the microwave signal, wherein the respective receiver unit is configured to examine the correct designator to decrease mutual interference of microwave barriers. For this purpose, the respective microwave barrier can be arranged to be operated based on the microwave signal modulated with the designator.

According to an aspect, it is proposed that the respective microwave signal of at least one microwave barrier of the microwave barrier system is code modulated, and the at least one microwave barrier is configured to be operated based on the code modulated microwave signal, in particular for determining the damping in the coupling path of the at least one microwave barrier. In other words, the at least one microwave barrier can be selectively operated with a respective microwave signal modulated with the code to distinguish the respective microwave signal from microwave signals of other microwave barriers to decrease mutual interference of the microwave barriers. The respective codes of different microwave barriers can differ for this purpose.

According to an aspect, it is proposed that a single microwave receiver unit is both the microwave receiver unit of the first microwave barrier and the microwave receiver unit of the second microwave barrier.

With a single microwave receiver unit for a plurality of microwave transmitter units, each aligned with the single microwave receiver unit to form a plurality of coupling paths, a microwave barrier system can be configured with a reduced hardware cost. For example, four microwave transmitter units can be combined with one microwave receiver unit to implement four microwave barriers with four coupling paths. Such a configuration of microwave barriers can be used to determine a position of an object in space or a level in a vessel. However, the hardware complexity in this example is reduced by a total of three microwave receiver units. Each microwave transmitter unit can be assigned its own microwave-operating channel in this configuration, and the microwave receiver unit can be tuned to each of the assigned microwave operating channels, for example sequentially, or with any other type of access, to determine the microwave signal radiated by each microwave transmitter unit, particularly in terms of its power. Thus, the radiated microwave signal can be determined without being interfered with by the microwave transmitter units operating on other microwave operating channels. The common microwave receiver unit can report or otherwise output the determined microwave signals, corresponding to the individual microwave operating channels, to a user of the microwave barrier system. If the transmission path from any microwave transmitter unit to the shared microwave receiver unit is interrupted or attenuated by an object or a level of a medium, the received power of the microwave signal is reduced, and upon falling below a threshold for that power, the microwave receiver unit can be arranged to generate a switching signal.

According to an aspect, it is proposed that the respective microwave signal of the respective microwave barrier is modulated with respect to an amplitude and/or a frequency and/or a phase of a frequency of the microwave signal; and/or the respective microwave signal is modulated in time. With such modulation, both a designator and a code can be transmitted. In this regard, the designator can be understood as a modulation that permanently identifies the respective microwave signal. The code can be understood as a modulation that temporarily identifies the respective microwave signal, in particular periodically repeated.

According to an aspect, it is proposed that the microwave transmitter unit of at least one microwave barrier of the microwave barrier system is configured to and/or a receiver unit of the at least one microwave barrier is configured to be operated by means of a microwave transceiver, both as a microwave transmitter unit and a receiver unit.

By means of such a microwave transceiver, the respective microwave barrier can transmit and receive the microwave signal in the different directions of the coupling path to decrease mutual interference of microwave barriers without mechanically changing the arrangement of the microwave barrier.

According to an aspect, it is proposed that the microwave barrier system is configured to assign the microwave operating channels to the respective microwave transmitter units of the respective microwave barriers, and in particular to the microwave receiver units, of the microwave barrier system sequentially in time and/or cyclically in time.

In this regard, a temporally cyclic association can be an association that is performed respectively after a time interval has elapsed. This association of the respective microwave-operating channel to the respective microwave barriers can occur at an operational start of the microwave barrier system and/or subsequently to a fault detected by the microwave barrier system. That is, the microwave barrier system can be arranged to detect disturbances in the respective microwave barriers and/or to assign microwave operating channels to the respective microwave barriers based on a detected disturbance and, in particular, to transmit the microwave operating channels to the respective microwave barriers.

According to an aspect, it is proposed that both functional units of the respective microwave barriers, i.e., both the microwave transmitter unit and the respective microwave receiver unit of the microwave barrier are formed based on so-called transceivers.

In this case, bidirectional data transmission, in particular based on different microwave operating channels, is possible. In this case, both functional units of the respective microwave barriers can monitor each other, for example. If one of these functional units fails, a misinterpretation of an occupied coupling path, or a transmission path, can be prevented.

According to an aspect, it is proposed that the respective microwave barriers of the microwave barrier system are coupled to an evaluation unit of the microwave barrier system to detect the different positions of at least one object and/or a movement of the object.

The respective microwave transmitter unit of a respective microwave barrier can be arranged to be operated at a selectable microwave frequency, in particular by means of an electrical tuning of a microwave generator of the microwave transmitter unit. Additionally or alternatively, the respective microwave receiver unit of a respective microwave barrier can be set up, in particular by means of electrical tuning of a microwave generator of the microwave receiver unit, to be operated at a selectable microwave frequency in order to selectively evaluate and/or determine a microwave signal received by the receiver unit, in particular with respect to a microwave operating channel, for operation of the microwave barrier.

Thereby, the first microwave barrier can be arranged to be operated with the microwave-operating channel and to filter out the microwave-operating channel from extraneous signals to decrease interference of the first microwave barriers by extraneous signals. Such selection of the microwave-operating channel can be performed by the microwave receiver unit using an intermediate frequency filter.

The extraneous signals can be characterized in particular by an extraneous signal amplitude determined by means of the microwave receiver unit. In order to minimize interference, in particular to the reliable operation of the microwave barrier in question, and thus to make the signal-to-noise ratio as large as possible, the extraneous signal amplitude in the particular microwave operating channel should be as small as possible.

For determining the microwave-operating channel, the microwave receiver unit can be configured to determine the respective extraneous signal amplitude for at least a portion of the plurality of available frequency channels to minimize interference with the operation of the first microwave barrier by extraneous signals. For example, the available microwave-operating channel can be selected as the microwave-operating channel that comprises the lowest possible extraneous signal amplitude.

For this purpose, the first microwave barrier can be configured to go through a sequence for activating the first microwave barrier, which can be a start sequence and/or cyclically repeated in time. The microwave receiver unit can be configured to deactivate the respective associated microwave transmitter unit during a phase of the sequence for activation to improve the determination of the extraneous signal amplitude.

For example, the sequence for activating the microwave barrier system can comprise the following steps after a microwave barrier startup or microwave barrier malfunction:
  checking at least a portion of the available microwave operating channels for an extraneous signal amplitude;
  determining the signal-to-noise ratio for the microwave operating channel, respectively;
  repeating said testing until a microwave operating channel is found in which a sufficiently high signal-to-noise ratio can be achieved on said microwave operating channel based on the determined extraneous signal amplitude; and
  determining this microwave operating channel for the operation of the respective microwave barrier.

In addition, the information about the extraneous signals amplitude can be stored in the different available frequency channels for the respective microwave barrier.

In particular, the respective microwave barrier and/or microwave barrier system can be configured to transmit the microwave-operating channel intended for operation and/or amplitudes of extraneous signals from the respective microwave barrier to another microwave barrier of the microwave barrier system to assign the respective microwave operating channels such that mutual interference between the microwave barriers is decreased.

The signal-to-noise ratio can be determined by determining the extraneous signal amplitude relative to a stored microwave receiver signal and/or to a microwave receiver signal determined, in particular by means of the microwave receiver unit, when the microwave transmitter unit is activated.

When determining operating channels in a system with a plurality of microwave barriers, available frequency channels can also be assigned twice to some of the plurality of microwave barriers. In particular, this can be the case when the microwave barriers in question having the same microwave operating channel are spaced widely separated from each other in the system of microwave barriers.

In a sequence for activating the microwave barrier system, microwave transmitter units of individual microwave barriers or of all microwave barriers can be deactivated and activated in phases.

The microwave barrier activation sequence can also be run during ongoing operation to achieve automatic switching of microwave operating channels, thereby decreasing interference from extraneous signals.

According to an aspect, it is proposed that the respective microwave barriers of a system of a plurality of microwave barriers are coupled to an evaluation unit to detect the different positions of at least one object and/or a movement of the object. Alternatively or additionally, a microwave barrier of the plurality of microwave barriers can be configured to detect the different positions of at least one object and/or a movement of the object.

According to an aspect, it is proposed that the second microwave barrier is configured to perform any of the methods described above, corresponding to the first microwave barrier.

A method of operating a microwave barrier system comprising a first microwave barrier, the first microwave barrier configured to be operated at a selectable microwave frequency, and at least one second microwave barrier, the second microwave barrier configured to be operated at a selectable microwave frequency, is proposed, comprising the steps of:
- providing a plurality of microwave barriers and/or an array of microwave barriers to be operated in the microwave barrier system;
- providing an available frequency range for microwave barrier system operation;
- determining available microwave operating channels for operation of the microwave barrier system; and
- assigning the available microwave operating channels to the respective microwave barrier in a manner that reduces mutual interference between the microwave barriers.

According to an aspect, the method can comprise the subsequent step of:
- transmitting the determined microwave-operating channel from the microwave receiver unit to the microwave transmitter unit, for operating the first microwave barrier on the operating channel.

In this regard, the association of the available microwave operating channels can be performed depending on an arrangement and/or a plurality of the microwave barriers, in order to reduce mutual interference of the microwave barriers, by distributing the available microwave operating channels evenly among the plurality of the microwave barriers and/or assigning to non-adjacent microwave barriers preferably different microwave operating channels with respect to the respective frequency.

According to an aspect, the method for selecting an operating channel for a first microwave barrier can additionally or alternatively comprise the steps of
- determining an extraneous signal amplitude for at least one frequency channel of the plurality of available frequency channels using the microwave receiver unit; and
- determining a microwave operating channel selected from the available frequency channels, and based on the at least one determined extraneous signal amplitude of the available frequency channels, minimizing interference with operation of the first microwave barrier by an extraneous signal.

According to an aspect, it is proposed that the method additionally comprises the steps of:
- providing an arrangement of the respective microwave barriers in the microwave barrier system;
- assigning the microwave frequency channels to spatially non-adjacent microwave barriers such that mutual interference by microwave irradiation of spatially adjacent microwave barriers in the microwave barrier system is decreased; and additionally or optionally:
- assigning microwave frequency channels to respective microwave barriers of the plurality of microwave barriers such that spatially adjacent microwave barriers of the microwave barrier system are assigned frequency channels that are non-adjacent to each other, respectively.

A computer program is proposed which includes instructions, which, when the computer program is executed by a computer, cause the computer program to perform any of the methods described above.

With such a computer program, the method can be easily implemented in different environments and/or applications and/or platforms.

A computer-readable medium is proposed on which the computer program described above is stored.

Thus, the method can be easily implemented on different control and monitoring devices.

A use of one of the microwave barrier systems described above for monitoring a position of an object is proposed, wherein the object is in particular bulk material.

By using the microwave barrier system for monitoring a position of an object, a production process can be monitored particularly reliably.

BRIEF DESCRIPTION OF THE FIGURES

Examples of embodiments of the invention are shown with reference to FIGS. 1 to 6 and are explained in more detail below.

DETAILED DESCRIPTION OF EMBODIMENTS

Figure 1:
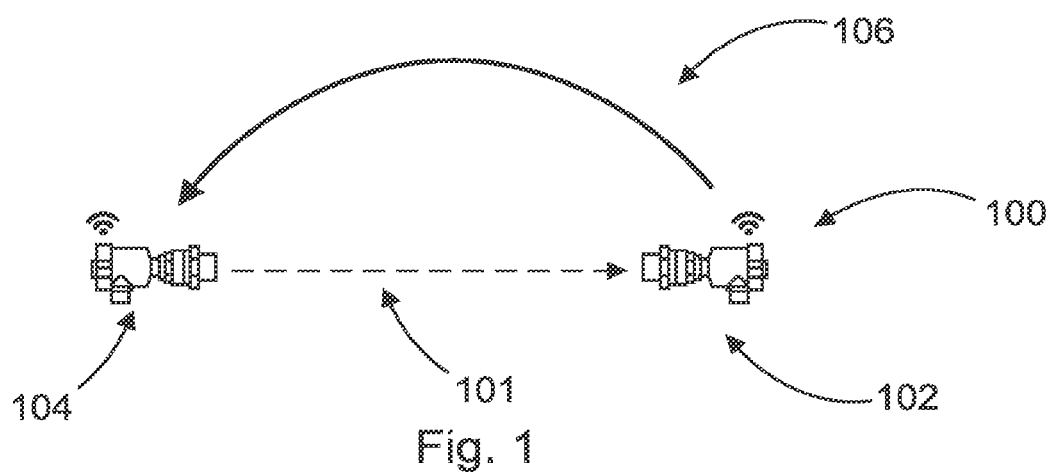
FIG. 1 depicts a microwave barrier of the microwave barrier system with communication units according to an embodiment.

FIG. 1 schematically sketches a microwave barrier 100 of a microwave barrier of a microwave barrier system comprising a microwave transmitter unit 104 and a microwave receiver unit 102 configured to signal-couple 106 the microwave receiver unit 102 with the microwave transmitter unit 104 to transmit an operating channel for operation of the microwave barrier 100 from the microwave receiver unit 102 to the microwave transmitter unit 104. The microwave receiver unit 102 and the microwave transmitter unit 104 are operatively coupled for operation of the microwave barrier via a coupling path 101 by directing microwave radiation from the microwave transmitter unit 104 to the microwave receiver unit 102, in particular to detect an object in the coupling path 101.

In a startup sequence, the microwave receiver unit 102 can scan a portion or all of the available microwave operating channels while the microwave transmitter unit 104 is disabled to determine a respective extraneous signal amplitude in at least a portion of the available microwave operating channels. In this regard, the determined extraneous signal amplitude can be caused by other adjacent microwave barriers or originate from other wireless services. However, either cause could interfere with the operation of the microwave barriers. When the microwave receiver unit 102 has determined a suitable microwave-operating channel to minimize interference with operation of the microwave barrier by extraneous signals, it transmits the microwave-operating channel to the microwave transmitter unit 104 by means of the communication unit to the microwave transmitter unit of the respective microwave barrier.

Figure 2A:
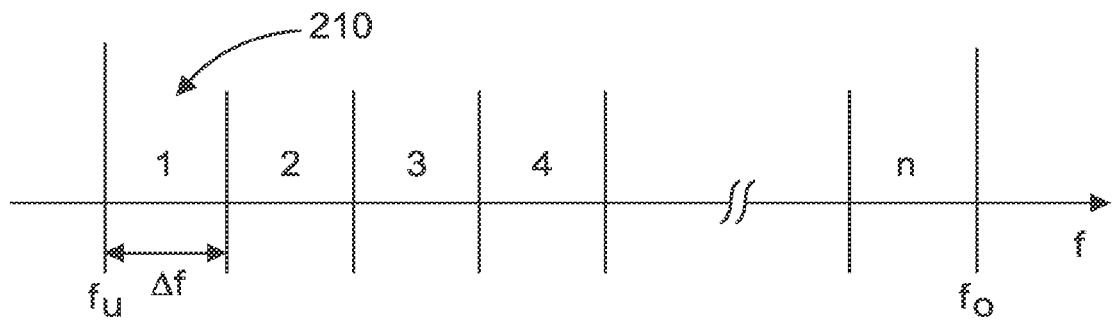
FIG. 2a depicts a plurality of microwave frequency channels according to an embodiment.

FIG. 2a schematically sketches a range of values of microwave frequencies f allowed for a microwave barrier operation, with a lower frequency, fu, and an upper frequency, fo, divided into a plurality of n microwave frequency channels with a respective width of Δf. A respective microwave barrier in a microwave barrier system can accordingly be assigned a microwave-operating channel in this range of values of microwave frequencies f to minimize mutual interference between microwave barriers.

Figure 2B:
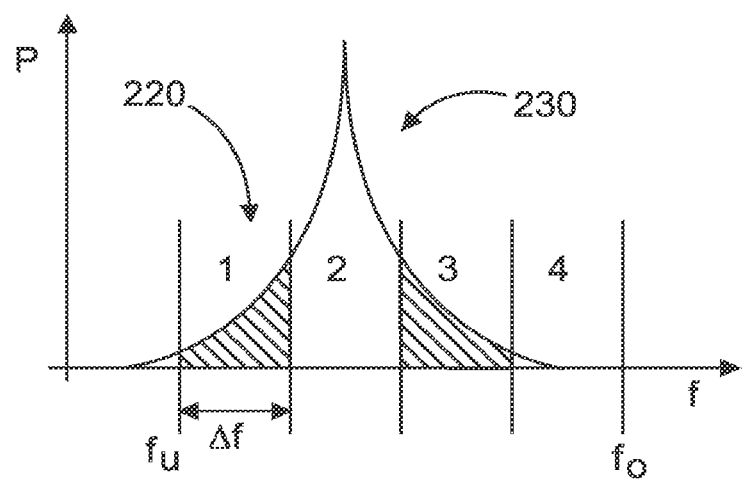
FIG. 2b depicts a diagram of microwave frequency channels according to an embodiment.

FIG. 2b schematically sketches a diagram with microwave operating channels corresponding to FIG. 2a, where the permissible frequency range between a lower frequency fu and an upper frequency fo has been divided into four microwave operating channels. In addition, a power or power spectrum P 230 of a microwave transmitter unit of a microwave barrier is plotted above the frequency, which has been assigned a microwave-operating channel with the number 2 and accordingly emits microwave radiation in the second channel. In this regard, the adjacent first channel 220 and the adjacent third channel can receive microwave radiation due to the finite width of the power spectrum of the microwave radiation 220 of the microwave transmitter unit, which degrades a signal-to-noise ratio for a microwave barrier whose microwave transmitter unit is operated in the adjacent microwave operating channels.

Figure 2C:
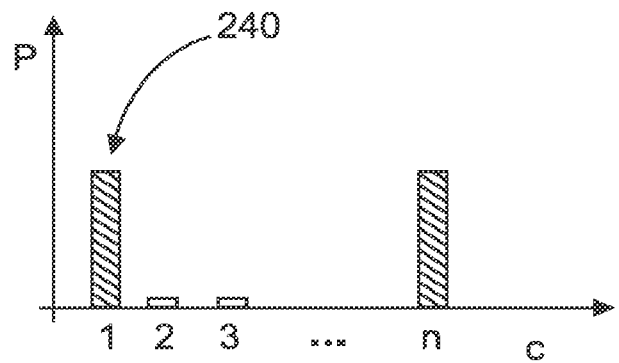
FIG. 2c depicts a power diagram of frequency channels according to an embodiment.

FIG. 2c sketches schematically, a power diagram by plotting over a plurality n of available microwave operating channels, c 240, a certain microwave power, P, determined, for example, by the microwave receiver unit 102 of a microwave barrier. In this regard, a high-power value is plotted in the first and nth channels c 240, which can be caused, for example, respectively by a microwave irradiation of another microwave barrier. By means of determining such microwave power P, an extraneous signal amplitude can be determined for each, or only a portion, of the plurality of available frequency channels c 240 to determine a microwave operating channel for operation of the microwave barrier such that interference with operation of the microwave barrier by extraneous signals and/or other microwave barriers of the microwave barrier system is minimized. For example, the microwave-operating channel can be determined using an available microwave-operating channel that comprises a minimum extraneous signal amplitude.

Figure 3:
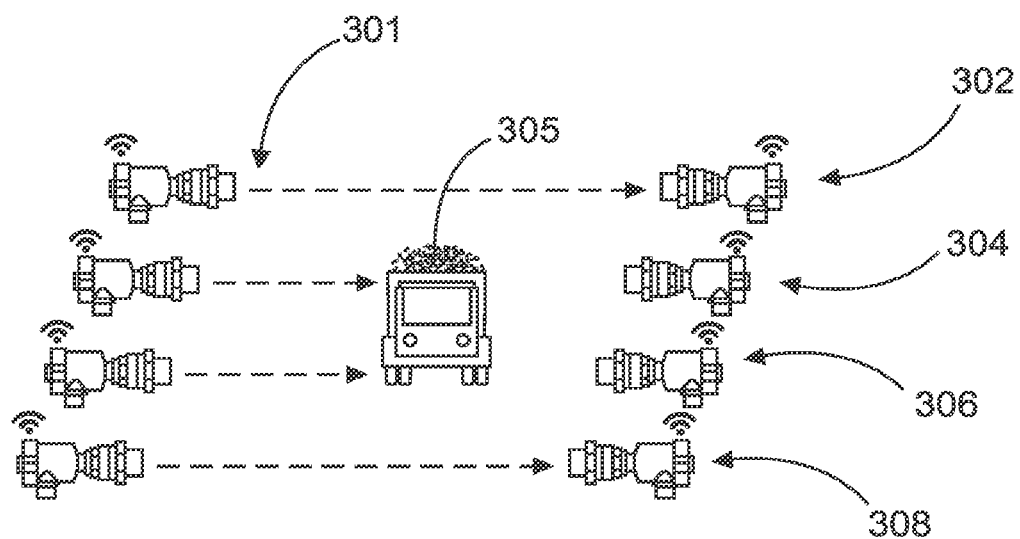
FIG. 3 depicts a microwave barrier system according to an embodiment.

FIG. 3 schematically sketches a system of four microwave barriers 302, 304, 306, and 308 with a first microwave barrier 302 and a second microwave barrier 304 within a system of four microwave barriers 302, 304, 306, and 308, which are operated adjacent to each other.

In this regard, each microwave barrier 302, 304, 306, and 308 can comprise a microwave transmitter unit having an electrically tunable microwave generator and is configured to operate at a selectable microwave frequency. The microwave receiver unit can be configured accordingly with an electrically tunable microwave generator to selectively determine a microwave signal from the respective microwave transmitter unit, with respect to a detected microwave frequency.

A position of an object 305 can be detected, depending on the position of the object 305 in respective coupling paths 301 of respective microwave barriers 302, 304, 306, and 308 of the system of microwave barriers 302, 304, 306, and 308.

In this regard, the object 305 can interact with a respective coupling path 301 between the respective microwave transmitter unit and a respective associated receiver unit such that a microwave signal transmitted from the respective microwave transmitter unit toward the respective receiver unit is damped.

The four microwave barriers 302, 304, 306, and 308 are configured to transmit a particular microwave operating channel from the microwave receiver unit of the respective microwave barriers 302, 304, 306, and 308 to the respective microwave transmitter unit by means of a communication unit symbolized by a wireless signal, respectively, and at least the respective microwave receiver units of the four microwave barriers 302, 304, 306, and 308 are configured to be signal-coupled to each other in accordance with a master-slave method, 304, 306, and 308 are configured to be signal coupled to each other to determine, in accordance with a master-slave method, the respective operating channels of the four microwave barriers 302, 304, 306, and 308 and to minimize interference in operating the system of the four microwave barriers 302, 304, 306, and 308.

In this respect, the respective microwave barriers 302, 304, 306, and 308 can be configured, in particular in a start-up sequence for selecting an operating channel for the respective microwave barrier, to determine an extraneous signal amplitude by means of the respective microwave receiver unit for at least a portion of a stored plurality of available frequency channels for microwave barriers. In this startup sequence, the respective microwave receiver unit can scan all available frequency channels while the respective, or all, microwave transmitter units are deactivated to determine a respective extraneous signal amplitude in at least a portion of the available frequency channels.

In an example, such as the diagram of FIG. 2c, the signal in frequency channel 1 or n can either be caused by other adjacent microwave barriers or originate from other wireless services. However, both can interfere with the operation of the microwave barrier system.

By configuring the respective microwave barriers 302, 304, 306, and 308 with their communication means to be signal coupled to each other, a respective microwave operating channel for the respective microwave barrier, based on the at least one particular extraneous signal amplitude of the available frequency channels, to minimize interference with operation of the first microwave barrier by an extraneous signal. The transmission of the determined operating channel to the respective microwave transmitter unit of the microwave barriers 302, 304, 306, and 308 and the signal-wise coupling of the microwave barriers 302, 304, 306, and 308 to each other can be performed, by wire and/or wirelessly, in particular wirelessly via BLUETOOTH® and/or via microwaves, in particular the microwaves of the microwave barrier, and/or WLAN.

By signal coupling the microwave barriers 302, 304, 306, and 308 to each other, for example in a master-slave method and/or by means of a separate evaluation unit, a respective microwave operating channel can be determined for each microwave barrier to minimize interference with the operation of the system of four microwave barriers 302, 304, 306 and 308 by an extraneous signal and transmitted to the respective microwave transmitter unit.

The extraneous signals determined with the microwave barriers 302, 304, 306, and 308, respectively, can be transmitted to the evaluation unit or a master to determine the operating channels for the respective microwave barriers 302, 304, 306, and 308 and transmit them to the respective microwave barrier and/or the respective microwave transmitter units.

That is, the respective microwave barrier can be configured to be signal coupled to all microwave transmitter units and all microwave receiver units of the system of microwave barriers to communicate with each other in a system of microwave barriers. One of the microwave receiver units can be configured as a master to determine and transmit the operating channels for the respective microwave barriers 302, 304, 306, and 308 to the respective microwave barriers 302, 304, 306, and 308 or their microwave transmitter units. In particular, the determined extraneous signal amplitudes can be taken into account for determining the respective operating channels for the respective microwave barriers 302, 304, 306, and 308.

In this regard, interference radiation caused by an operation of one of the microwave transmitter units of the microwave barriers can be interpreted as extraneous signal amplitude.

For example, the respective operating channels can be assigned in such a way that spatially adjacent microwave barriers are assigned frequency channels that are non-adjacent in terms of frequency. By means of an optimization procedure, the operating channels can be further improved to minimize interference, taking into account extraneous signal amplitudes and interference radiation from participating microwave transmitter units. Thus, extraneous signals from other microwave transmitter units or other microwave sources can be prevented from causing misconnections of the microwave barrier system.

That is, microwave barrier 302 is assigned channel 1, for example; microwave barrier 304 is assigned channel 3; microwave barrier 306 is assigned channel 5; and microwave barrier 308 is assigned channel 2. In this regard, the microwave frequency channels 1 to 5 are arranged frequency-wise in ascending sequence non-adjacent to each other in a microwave frequency range, in particular between a lower frequency, fu, and an upper frequency, fo.

Figure 4:
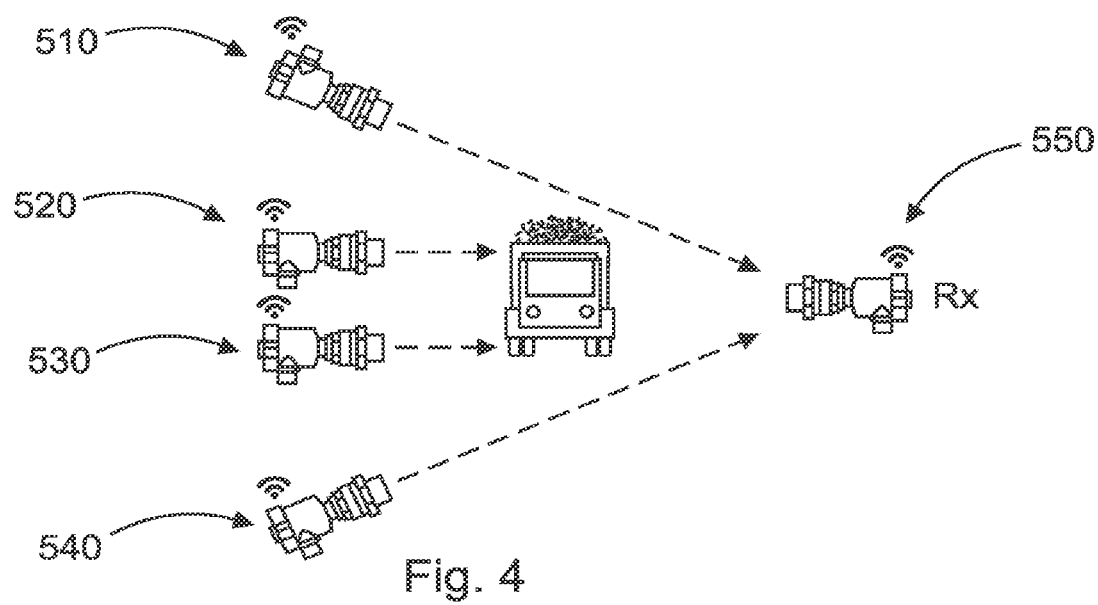
FIG. 4 depicts another microwave barrier system according to an embodiment.

FIG. 4 schematically sketches a microwave barrier system with four microwave transmitter units 510 to 540 and a single receiver unit 550, the single receiver unit 550 being the receiver unit for all microwave barriers 510 to 540 of the microwave barrier system. That is, the respective coupling path of the respective microwave barrier is established between the microwave transmitter units 510 to 540 and the receiver unit 550. In particular, the respective microwave transmitter unit 510 to 540 is configured to generate a microwave signal that is modulated and/or coupled to the receiver unit 550 by means of different microwave frequency channels. The receiving unit 550 is configured to selectively detect a damping of the microwave signal based on the modulated microwave signal and/or corresponding to the associated microwave frequency channel.

Figure 5:
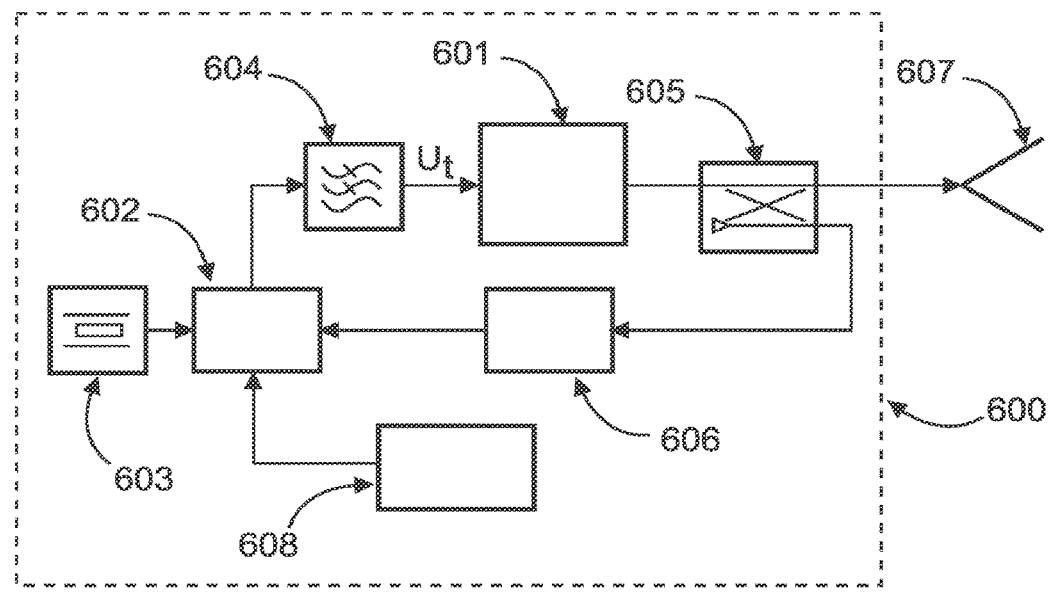
FIG. 5 depicts a transmitter of a microwave barrier according to an embodiment.

FIG. 5 schematically sketches a block diagram of a transmitter of a microwave transmitter unit of a microwave barrier configured to be operated at a selectable microwave frequency. For this purpose, a voltage-controlled oscillator (VCO) 601, according to the block diagram of FIG. 5, is operated in a phase-locked loop. In the phase-locked loop, the voltage-controlled microwave oscillator 601 is phase-locked to a very stable reference oscillator 603 by means of a phase-locked loop (PLL) device 602.

Preferably, a temperature compensated crystal oscillator (TCXO) can be used as reference oscillator 603. With this phase-locked coupling, the excellent stability of the reference oscillator 603 can be transferred to the much higher frequency microwave oscillator 601.

The voltage-controlled microwave oscillator 601 is tuned by a control voltage, Ut, generated by the PLL device 602 and by means of a loop filter 604, where the loop filter 604 is coupled to both the PLL device 602 and the voltage-controlled microwave oscillator 601. The control loop is closed by decoupling a portion of the output signal of the voltage-controlled microwave oscillator 601 by means of a coupler 605 electrically coupled to an output of the voltage-controlled microwave oscillator 601, and supplying it to the PLL device 602 by means of an optional prescaler 606 electrically coupled to the coupler 605. This signal is compared by means of the PLL device 602 in a phase comparator of the PLL device 602 with the signal of the reference oscillator 603.

A phase difference arising in the phase comparator between the two input signals of the PLL device 602, namely from the reference oscillator 603 and the output of the voltage-controlled microwave oscillator 601, is immediately compensated for by the control system so that a very stable and low-noise microwave transmission signal is generated by means of the voltage-controlled microwave oscillator 601.

The programming of the PLL device 602 and thus also the frequency adjustment of the microwave transmit signal, which is fed to a transmit antenna 607 via the coupler 605, is preferably carried out by means of a microcontroller 608 or another processing unit. Many voltage-controlled oscillators on the market comprise internal couplers and prescaler. In this case, the coupler 605 and prescaler 606 are omitted as separate devices and the voltage-controlled microwave oscillator 601 comprises an additional prescaler output, which in turn is electrically coupled to the PLL device.

A change in the transmit channel is programmed into the PLL device 602 by means of the processor 608. The control loop described above ensures that the voltage-controlled microwave oscillator 601 is quickly tuned to the new desired microwave frequency, and thus the microwave barrier is tuned to a new microwave frequency channel.

Figure 6:
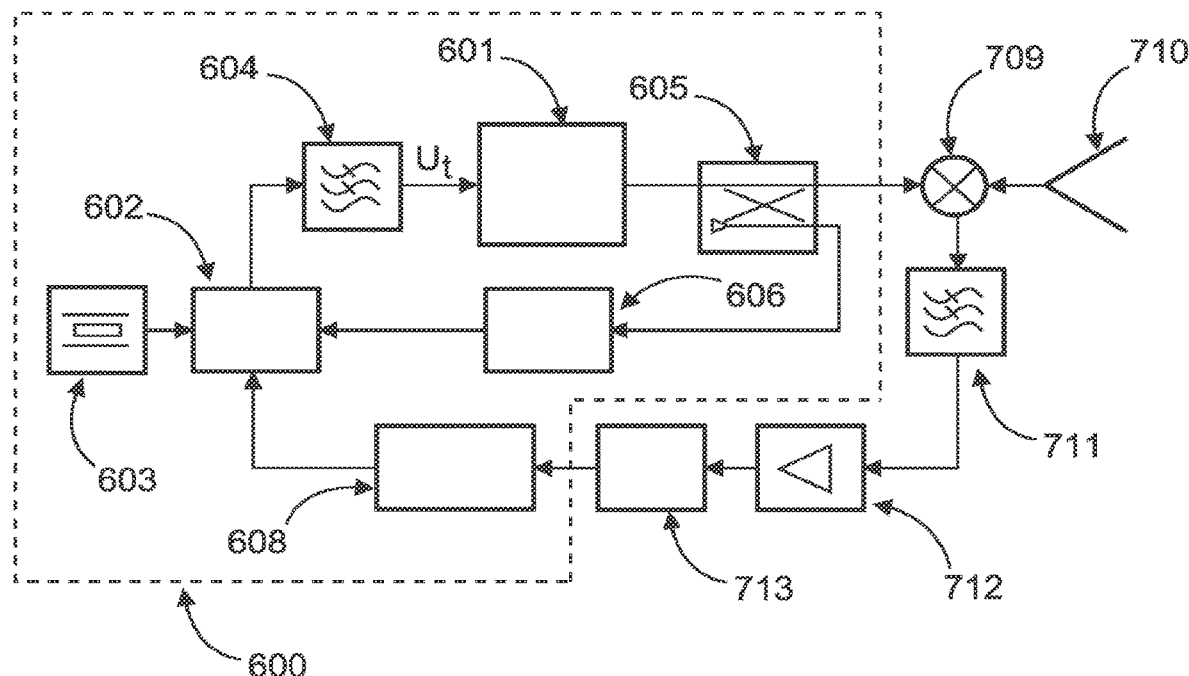
FIG. 6 depicts a receiver of a microwave barrier according to an embodiment.

FIG. 6 schematically sketches a block diagram of a receiver unit of a microwave barrier configured to selectively detect a damping of the microwave signal based on an associated microwave frequency channel.

The oscillator circuit 600 corresponds to the oscillator circuit 600 of FIG. 5. This oscillator circuit 600 is thus configured to generate a local oscillator (LO) signal for a mixer 709. A corresponding receive signal received by the receive antenna 710 is mixed down with the LO signal in the mixer 709 into a much lower frequency intermediate frequency signal. The frequency difference between the LO signal and the received signal is a fixed value and determines the frequency of the intermediate frequency signal. The intermediate frequency signal then passes through a band-pass filter 711 and is amplified in an intermediate frequency amplifier 712. Subsequently, the signal is sampled in an AD converter 713, for example, and the received level is further processed and evaluated in the processor 608. As an alternative to the AD converter 713, a logarithmic amplifier can also be used.

The frequency tuning of the receiver circuit to different microwave frequency channels is performed in the same way as for the transmitter circuit 600. Sequential tuning to the channels used, for selective reception of different microwave frequency channels, as for example by the receiver unit, which is comprised by means of FIG. 5, can also be realized thereby.

Alternatively, instead of sequentially tuning the receiver to each used channel, the complete used frequency spectrum in the respective allowed frequency band can be mixed into the intermediate frequency range. The prerequisite for this is that the band pass filter 711 and the subsequent components in the signal path are "wide" enough to be able to process the respective frequency band together. To determine the individual levels in the microwave frequency channels used, the intermediate frequency signal can be sampled for this purpose and transformed from the time domain to the frequency domain using a Fourier transform. From the resulting intermediate frequency spectrum, the received levels can then be selectively assigned to the individual channels used.

The transmitter circuit 600 of FIG. 5 or 6 can be made of individual components or integrated in an integrated circuit. This applies in particular to the components: voltage-controlled microwave oscillator 601; PLL device 602; loop filter 604; coupler 605; prescaler 606 and the processor 608, which are predestined to be integrated on a common chip.

In the receiver circuit of FIG. 6 the additional components mixer 709, band pass filter 711, intermediate frequency amplifier 712 and the AD-converter 713 could be integrated additionally. An integration of only partial components of the mentioned components is also possible.

In general, commercial PLL devices comprise a modulation input which can be used to apply information to the CW (continuous wave) output signal of the oscillator circuit 600 of FIG. 6 by means of, for example, FSK (frequency shift keying) or PSK (phase shift keying) modulation or other types of modulation.

The invention claimed is:

1. A microwave barrier system, comprising:
a first microwave barrier comprising a first microwave transmitter and a first microwave receiver, the first microwave transmitter comprising a first electrically tunable microwave generator, the first microwave barrier being configured to be operated at a selectable microwave frequency; and
a second microwave barrier comprising a second microwave transmitter and a second microwave receiver, the second microwave transmitter comprising a second electrically tunable microwave generator, the second microwave barrier being configured to be operated at a selectable microwave frequency,
wherein the microwave barrier system is configured to:
determine microwave operating channels in an available frequency range for microwave barriers by means of at least one of the first microwave receiver and the second microwave receiver, and
assign a respective microwave operating channel to at least one of the first microwave barrier and the second microwave barrier so as to reduce mutual interference between the first microwave barrier and the second microwave barrier,
wherein the first microwave barrier further comprises a first communication unit configured to signal-couple the first microwave receiver with the first microwave transmitter, wired and/or wireless, to transmit a first microwave operating channel for operation of the first microwave barrier from the first microwave receiver to the first microwave transmitter, and
wherein the second microwave barrier further comprises a second communication unit configured to signal-couple the second microwave receiver with the second microwave transmitter, wired and/or wireless, to transmit a second microwave operating channel for operation of the second microwave barrier from the second microwave receiver to the second microwave transmitter.

2. The microwave barrier system according to claim 1, wherein the microwave barrier system is further configured to assign the respective microwave operating channel to the at least one of the first microwave barrier and the second microwave barrier depending on a provided plurality of microwave barriers and/or a provided arrangement of the at least one of the first microwave barrier and the second microwave barrier such that spatially adjacent microwave barriers of the microwave barrier system are assigned frequency channels such that mutual interference by microwave irradiation of spatially adjacent microwave barriers in the microwave barrier system is reduced.

3. The microwave barrier system according to claim 1, wherein the at least one of the first microwave receiver and the second microwave receiver is configured to determine a damping of a microwave signal based on a microwave operating channel.

4. The microwave barrier system according to claim 2, wherein the microwave barrier system is further configured to assign microwave operating channels to the first and the second microwave barriers depending on the provided arrangement of the at least one of the first microwave barrier and the second microwave barrier such that spatially adjacent microwave barriers of the microwave barrier system are assigned non-adjacent microwave operating channels in terms of frequency, respectively.

5. The microwave barrier system according to claim 1,
wherein the first and the second microwave receivers are configured to determine an extraneous signal amplitude for at least one microwave operating channel of a plurality of available frequency channels, and
wherein the at least one microwave operating channel is determined from the plurality of available frequency channels based on at least one determined extraneous signal amplitude of the plurality of available frequency channels to decrease interference with operation of the at least one of the first and the second microwave barriers by an extraneous signal.

6. The microwave barrier system according to claim 1, wherein the first and the second microwave receivers are configured to be signal coupled to a respective microwave transmitter of the first and the second microwave transmitters by means of a respective communication unit of the first and the second communication units by wire and/or by wireless means.

7. The microwave barrier system according to claim 6, wherein the wire is a respective power supply line and the wireless means is near-field communication or a wireless local area network.

8. The microwave barrier system according to claim 1, wherein the first and the second communication units are configured to respectively signal-couple the first and the second microwave receivers to a further microwave barrier in order to determine a microwave operating channel for operation of the further microwave barrier, and/or to transmit the microwave operating channel to the further microwave barrier, and/or to transmit an extraneous signal amplitude determined by a further receiver of the further microwave barrier to the respective first and second microwave barriers.

9. The microwave barrier system according to claim 1,
wherein the first microwave barrier is spatially adjacent to the second microwave barrier; and
wherein the microwave barrier system is further configured to determine the first microwave operating channel of the first microwave barrier while the second microwave transmitter of the second microwave barrier is operating on the second microwave operating channel.

10. The microwave barrier system according to claim 9, wherein interference radiation caused by an operation of the second microwave barrier transmitter on the second microwave operating channel is interpreted by the first microwave barrier as extraneous signal amplitude to determine the first microwave operating channel for the first microwave barrier.

11. The microwave barrier system according to claim 1, wherein the microwave barrier system is further configured to transmit, by means of a respective communication unit of the first and the second communication units, diagnostic information from a respective microwave transmitter of the first and the second microwave transmitters, to a respective microwave receiver of the first and the second microwave receivers, to prevent and/or to determine a malfunction of a respective microwave barrier of the first and the second microwave barriers.

12. The microwave barrier system according to claim 1, wherein a respective microwave receiver of the first and the second microwave receivers is coupled to a respective microwave transmitter of the first and the second microwave transmitters by means of a microwave signal based on a respective microwave operating channel of the first and the second microwave operating channels to establish a coupling path between the respective microwave transmitter and the respective microwave receiver.

13. The microwave barrier system according to claim 12, wherein the microwave barrier system is further configured to determine an attenuation of the microwave signal in the coupling path.

14. The microwave barrier system according to claim 1, wherein at least one of the first and the second microwave barriers is further configured to be operated based on a modulated microwave signal to decrease mutual interference of at least two microwave barriers of the microwave barrier system.

15. The microwave barrier system according to claim 14,
wherein a microwave transmitter of the at least one of the first and the second microwave barriers is configured to generate the modulated microwave signal, and
wherein a receiver coupled to the microwave transmitter is configured to selectively detect damping of a microwave signal based on the modulated microwave signal.

16. The microwave barrier system according to claim 14,
wherein a respective microwave signal of the at least one of the first and the second microwave barriers is modulated with a code, and
wherein a respective microwave barrier of the first and the second microwave barriers is further configured to be selectively operated based on a microwave signal modulated with the code.

17. The microwave barrier system according to claim 1, wherein a single microwave receiver is both the microwave receiver of the first microwave barrier and the microwave receiver of the second microwave barrier.

\* \* \* \* \*